US012392177B2

(12) United States Patent
Greenough et al.

(10) Patent No.: US 12,392,177 B2
(45) Date of Patent: Aug. 19, 2025

(54) SYSTEM AND METHOD OF PREVENTING FORCED ENTRY OF A DOORWAY

(71) Applicants: Leonard Wayne Greenough, Wilmington, NC (US); David Wayne Greenough, Wilmington, NC (US); Jonathan Vance Clark, Wilmington, NC (US); Jacob Scott Clark, Wilmington, NC (US)

(72) Inventors: Leonard Wayne Greenough, Wilmington, NC (US); David Wayne Greenough, Wilmington, NC (US); Jonathan Vance Clark, Wilmington, NC (US); Jacob Scott Clark, Wilmington, NC (US)

( * ) Notice: Subject to any disclaimer, the term of this patent is extended or adjusted under 35 U.S.C. 154(b) by 0 days.

(21) Appl. No.: 18/195,053

(22) Filed: May 25, 2023

(65) Prior Publication Data

US 2024/0392617 A1 Nov. 28, 2024

(51) Int. Cl.

| | |
|---|---|
| ***E05C 17/46*** | (2006.01) |
| ***E05C 17/12*** | (2006.01) |
| ***E05C 19/00*** | (2006.01) |
| ***E05C 19/18*** | (2006.01) |

(52) U.S. Cl.

CPC .............. *E05C 17/46* (2013.01); *E05C 17/12* (2013.01); *E05C 19/003* (2013.01); *E05C 19/18* (2013.01)

(58) Field of Classification Search

CPC ........ E05C 17/46; E05C 17/48; E05C 19/184; E05C 19/003; E05C 19/18; E05C 1/04; E05C 17/12; E05C 17/54; E05B 2063/0039

See application file for complete search history.

(56) References Cited

U.S. PATENT DOCUMENTS 1,119,650 A * 12/1914 Smith ..................... E05C 17/54 292/343
1,452,014 A * 4/1923 Wolfe ..................... E05C 17/38 70/279.1
1,533,687 A * 4/1925 Beck ......................... E05F 5/06 292/DIG. 19

(Continued)

FOREIGN PATENT DOCUMENTS

CN 112127723 A * 12/2020 ............. E05C 19/18
DE 10252014 A1 * 5/2004 ............. E05C 17/48
EP 3922795 A1 * 12/2021 ............. E05C 17/46

*Primary Examiner* — Christine M Mills

*Assistant Examiner* — Faria F Ahmad

(74) *Attorney, Agent, or Firm* — Ashley D. Johnson; Dogwood Patent and Trademark Law

(57) ABSTRACT

The invention is a system that prevents the opening of a door into a room or other area by an intruder. The system includes an aperture positioned in flooring, the aperture located adjacent to a first side edge and bottom edge of a closed door. The system also includes a block comprising an internal passageway with about the same dimensions as the aperture. The system further includes an elongated pin comprising a first end and a second end, wherein the pin is configured to pass through the block internal passageway and into the aperture. The block is held in position over the aperture when the pin passes through the block internal passageway and into the aperture. When the block is held in position, the closed door is prevented from opening.

20 Claims, 7 Drawing Sheets

(56) References Cited

U.S. PATENT DOCUMENTS 1,808,393 A * 6/1931 Wecker ................. E05C 17/443 292/338
2,497,697 A * 2/1950 Smith ..................... E05C 17/56 292/144
4,178,026 A * 12/1979 Sinkhorn ................ E05C 19/18 292/288
4,343,500 A * 8/1982 Steiner .................... E05C 17/48 292/144
5,398,982 A * 3/1995 Watson, Jr. ............. E05C 3/048 292/259 R
5,454,143 A * 10/1995 Wigley, Sr. ............. E05C 19/18 16/82
5,458,383 A * 10/1995 Gunn .................... E05B 67/383 292/148
5,490,304 A * 2/1996 Winner, Jr. ............... E05F 5/06 16/82
5,590,918 A * 1/1997 Kambalov ............ E05C 19/184 16/82
5,799,367 A * 9/1998 Simon ....................... E05F 5/06 292/DIG. 19
5,983,680 A * 11/1999 Del Nin .................... E05C 9/10 70/93
6,471,264 B1 * 10/2002 Ryan ......................... E05C 1/04 292/262
6,557,912 B1 * 5/2003 Truong ................... E05C 17/50 292/342
7,367,596 B2 * 5/2008 Leung ................... E05B 67/383 292/281
7,651,140 B2 * 1/2010 Leggio ...................... E05C 1/04 292/342
D717,641 S * 11/2014 Hugo ............................ D8/402
8,894,110 B2 * 11/2014 Taylor ................... E05C 19/184 292/288
D722,495 S * 2/2015 Hugo ............................ D8/402
9,238,926 B2 * 1/2016 Guerrero ............. E05B 17/2076
9,388,620 B2 * 7/2016 Endo ..................... E05C 19/022
9,435,147 B1 * 9/2016 Giandomenico, Jr. ...................... E05B 19/20
9,562,377 B2 * 2/2017 Attard ................... E05B 67/383
9,598,885 B2 * 3/2017 Yamamoto ................ E05F 5/06
9,799,181 B2 * 10/2017 Cushwa, Jr. ........... G08B 13/08
D813,642 S * 3/2018 Tyus .............................. D8/343
9,963,920 B2 * 5/2018 Cheever .................. E05C 17/54
10,174,532 B2 * 1/2019 Couturier .............. E05C 19/184
10,316,556 B2 * 6/2019 Richmond .............. E05C 21/00
D853,832 S * 7/2019 Cheever .................. E05C 17/54 D8/402
11,649,661 B2 * 5/2023 Fischer ................... E05B 15/10 292/259 R
11,713,605 B2 * 8/2023 Fischer ................. E05C 19/003 292/338
2011/0291426 A1 * 12/2011 Gibson ................. E05C 19/188 292/137
2017/0211301 A1 * 7/2017 Richmond .............. E05B 63/18
2018/0238085 A1 * 8/2018 Richmond ................ E05C 5/02
2018/0371810 A1 * 12/2018 Howard .................... E05C 1/04
2019/0284853 A1 * 9/2019 Geenens ................. E05B 45/06
2019/0284854 A1 * 9/2019 Geenens ................. E05B 45/06
2021/0025205 A1 * 1/2021 Taylor ..................... E05B 45/06
2021/0032904 A1 * 2/2021 Silvani, Jr. ............ E05C 19/003
2021/0301570 A1 * 9/2021 Gin ........................... E05C 3/04
2021/0388653 A1 * 12/2021 Fischer ................... E05B 15/10
2022/0333406 A1 * 10/2022 Norcross ................... E05C 1/04

* cited by examiner

SYSTEM AND METHOD OF PREVENTING FORCED ENTRY OF A DOORWAY

FIELD OF THE INVENTION

The presently disclosed subject matter is directed to a system and method of preventing or reducing the likelihood of forced entry through a door or doorway.

BACKGROUND OF THE INVENTION

Many buildings such as offices, residences, and hotels include one-way, in-swing doors. The in-swing operation of doors often complies with building codes and best practices for weatherization, heating, and cooling. Where a building or residence is likely to be occupied (or targeted because it is known to be occupied), the risks and dangers of violent forced entry attacks and burglaries are particularly high. Violent forced entry attacks are more likely where the occupant is thought to be alone, unarmed, and/or defenseless against physical attack by a powerful or armed intruder. Although males are regularly victimized, females when alone, children, handicapped adults, and elderly persons are particularly susceptible to forced entry assaults, such as armed robberies and other violent crimes.

In response to the risks of substantial losses due to burglary and/or violent attacks, electronic security monitoring systems are often installed. Supplemental mechanical security devices may be attached to the door, door frame, or both. However, residents often leave the security system unarmed when they are home during the day, only setting the alarm at night before bed. In addition, residents often forget to set the alarm or improperly set the alarm, leaving the residence or building unprotected. In addition, one of the most effective mechanical security devices for an in-swing door of an occupied space is a large bar or rod leaning at an acute angle between the interior doorknob and a catch or receiver in the floor. Security rods, however, are large and cumbersome, which often deters people from their use. In addition, they are large and unsightly. Dead bolts and door locks are also effective when used, but they can easily be compromised by door picks and other similar equipment. For example, door chains that attach between the door and the door frame are generally not strong enough to withstand significant entry forces applied to the door. Moreover, once the door is partially opened, the door chain can be easily severed or cut. It would therefore be beneficial to provide a system and method for securing a building or residence that overcomes the shortcomings of the prior art.

SUMMARY OF THE INVENTION

The presently disclosed subject matter is directed to a door anti-opening system. Specifically, the system comprises an aperture positioned in flooring, the aperture located adjacent to a first side edge and bottom edge of a closed door. The closed door comprises a first side edge comprising a doorknob and optional lock, an opposed second side edge, a top edge, and a bottom edge. The system includes a block comprising an internal passageway, wherein the internal passageway has about the same dimensions as the aperture. The system further includes an elongated pin comprising a first end and a second end, wherein the pin is configured to removably pass through the block internal passageway and into the aperture.

In some embodiments, the presently disclosed subject matter is directed to a method of preventing the opening of a closed door. Specifically, the method comprises positioning a pin through a block passageway and into the aperture of a system. The system includes an aperture positioned in flooring, the aperture located adjacent to a first side edge and bottom edge of a closed door. The closed door comprises a first side edge comprising a doorknob and optional lock, an opposed second side edge, a top edge, and a bottom edge. The system includes a block comprising an internal passageway, wherein the internal passageway has about the same dimensions as the aperture. The system includes an elongated pin comprising a first end and a second end, wherein the pin is configured to pass through the block internal passageway and into the aperture. The block is held in position over the aperture when the pin passes through the block internal passageway and into the aperture. When the block is held in position, the closed door is prevented from opening.

In some embodiments, the aperture is positioned 0.25-5 inches from the door first side edge, bottom edge, or both.

In some embodiments, the aperture is directly adjacent to a portion of the closed door. The term "directly adjacent" refers to a distance of about 1 inch or less (e.g., the aperture is separated from a bottom edge of the closed door with a distance of at least about/no more than about 1, 0.9, 0.8, 0.7, 0.6, 0.5, 0.4, 0.3, 0.2, 0.1, 0.05 inches).

In some embodiments, the aperture has a depth of about 0.5-5 inches.

In some embodiments, the aperture has a length and width of about 0.25-2 inches.

In some embodiments, the block has a length, width, and height of about 2-10 inches.

In some embodiments, the pin has a height of about 2-10 inches.

In some embodiments, the pin has a height that is greater than the depth of the aperture plus the height of the block.

In some embodiments, the pin is dimensioned with about the same size and shape as the internal passageway and the aperture.

In some embodiments, the door remains fully closed when the block is held in position over the aperture.

In some embodiments, the door opens 2 inches or less when the block is held in position over the aperture.

DETAILED DESCRIPTION OF THE INVENTION

Figure 1A:
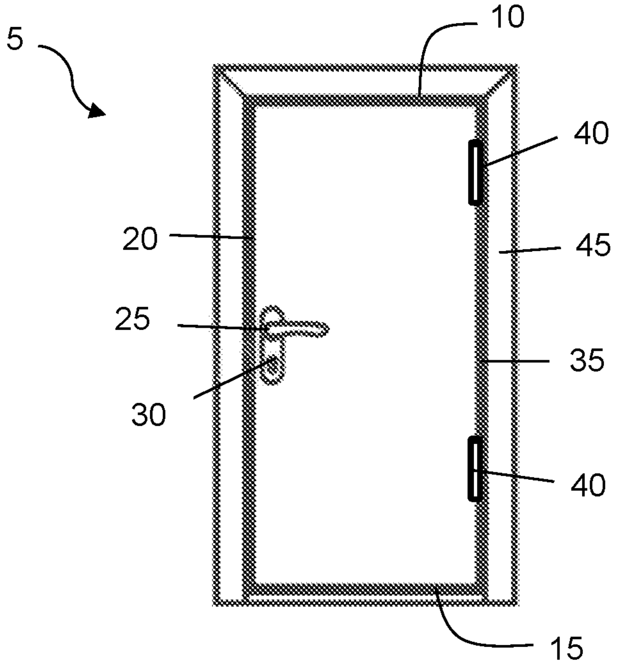
FIG. 1*a* is a front plan view of a closed door in accordance with some embodiments of the presently disclosed subject matter.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

Figure 1B:
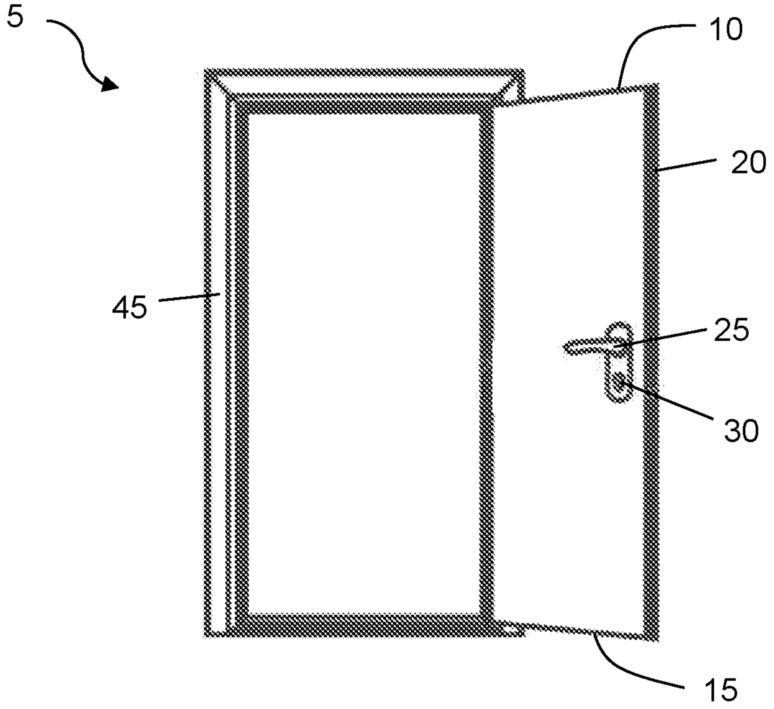
FIG. 1*b* is a front plan view of an open door in accordance with some embodiments of the presently disclosed subject matter.

The presently disclosed subject matter is directed to a system that provides an additional measure of security to prevent unauthorized opening of a door, such as during a burglary. Buildings and residences include one or more doors 5 that open to provide a way to enter or exit the dwelling, as illustrated in FIGS. 1*a* and 1*b*. The term "door" broadly refers to any barrier by which an entry is opened and closed. For example, the door can be an in-swing door that opens inward, into an enclosed space (such as a home).

As shown, door 5 includes top edge 10 and opposed bottom edge 15. The door further includes first side edge 20 that includes adjacent hardware (e.g., doorknob 25 and/or lock 30). The term "doorknob" includes any element that can be manipulated to actuate and open a door. The term "lock" refers to any element that prevents the opening of door 5. In some embodiments, the lock serves to selectively secure and retain the door within a door frame. The door further includes second side edge 35 comprising hinges or any other element(s) that allow the door to swing open on demand. Door 5 can include optional door frame 45 that provides a support enclosure for the door in some embodiments. Generally, the door is pivotably attached within door frame 45 by one or more hinges 40 to provide selective access to an enclosed area, such as a room.

Figure 2A:
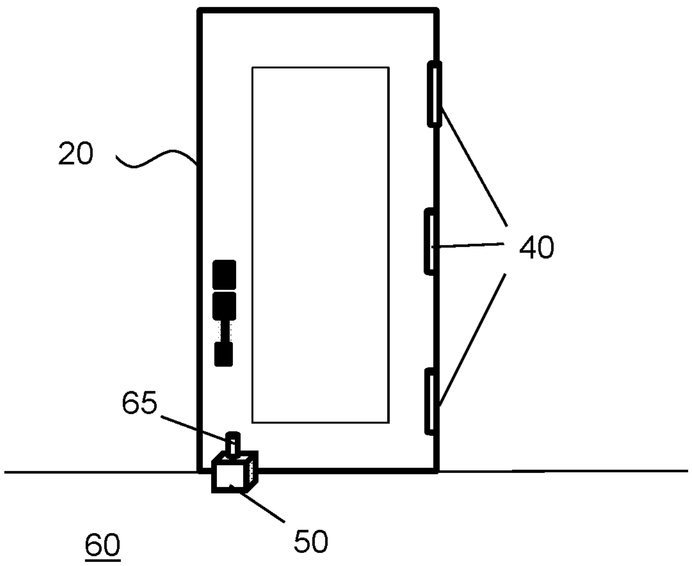
FIG. 2*a* is a front plan view of a door with an assembled blocking system in accordance with some embodiments of the presently disclosed subject matter.
Figure 2B:
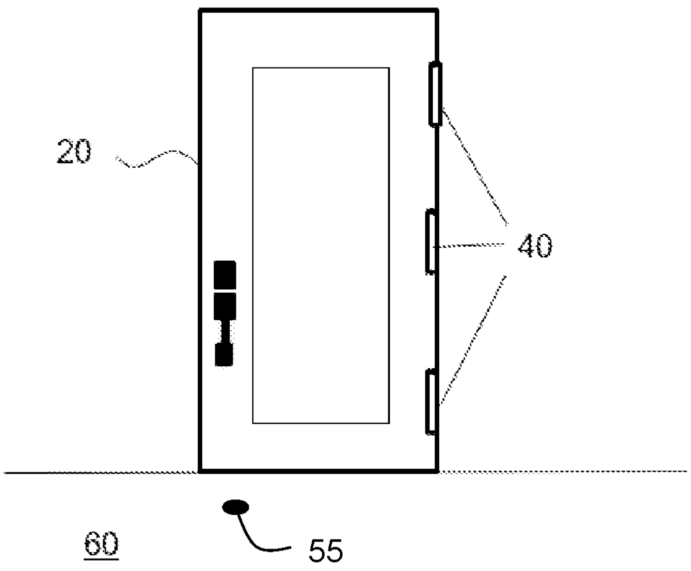
FIG. 2*b* is a front plan view with a disassembled blocking system in accordance with some embodiments of the presently disclosed subject matter.

As illustrated in FIG. 2*a*, the presently disclosed system includes block 50 positioned over receiving aperture 55 in flooring 60. The term "aperture" refers to any hole or opening. The term "flooring" includes any horizontal structural elements, such as hardwood flooring, tiles, stone, pavers, brick, cement, carpeting, and the like. Pin 65 passes through a passageway in the block and is secured within the flooring aperture, thereby holding the block in place adjacent to first side edge 20 of the door. In this way, the door is prevented from unintended opening past the block, such as during a burglary. When the user wishes to open the door, they simply remove pin 65 from the flooring aperture and can easily lift block 50 away, as shown in FIG. 2*b*. The door is then free to swing open.

Figure 3A:
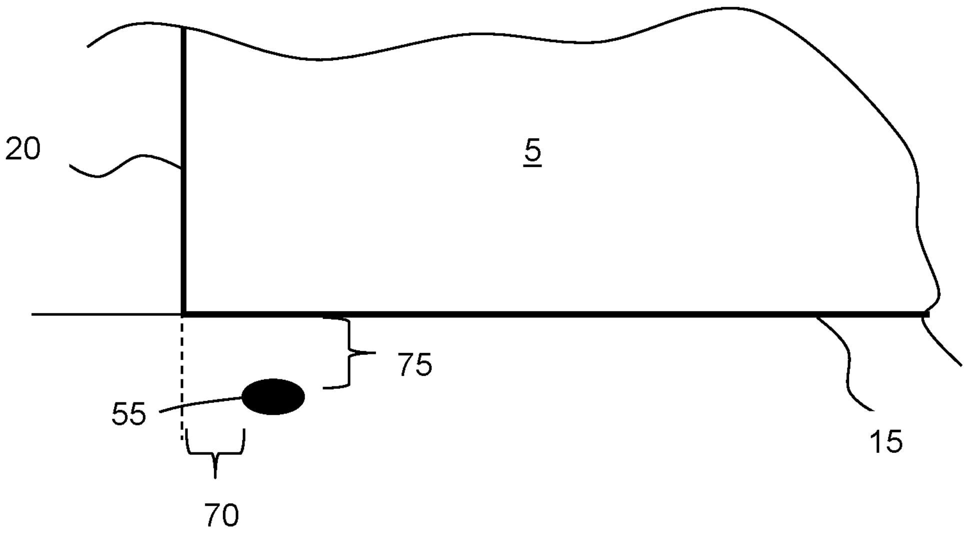
FIGS. 3*a* and 3*b* are fragmentary from plan views of a door with an associated system aperture in accordance with some embodiments of the presently disclosed subject matter.
Figure 3B:
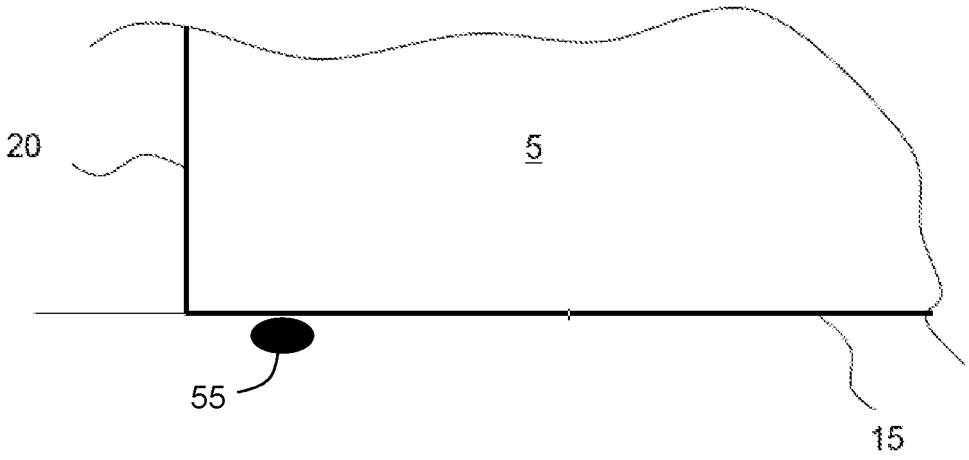

Flooring aperture 55 can be positioned at a distance 70 of about 1-10 inches from first side 20 of door 5, as shown in FIG. 3*a*. In some embodiments, aperture 55 can be positioned at a distance 75 of about 0.25-10 inches from bottom edge 15 (e.g., the front, interior face) of the door. Thus, the aperture can be configured in flooring 60 at least about (or no more than about) 0.25, 0.5, 1, 2, 3, 4, 5, 6, 7, 8, 9, or 10 inches from the bottom edge and/or first side edge of door 5. For example, in some embodiments, the aperture is directly adjacent to the door, such that when assembled, the door cannot move or be opened at all, as shown in FIG. 3*b*. Advantageously, being close to the first side edge and/or bottom edge of the door ensures that a burglar or other individual cannot exert enough force while swinging open the door to damage or forcibly remove the block and/or pin.

Aperture 55 can be configured in any desired shape, such as (but not limited to) circular, oval, square, rectangular, triangular, pentagonal, octagonal, star, abstract and the like. Any shape can be used.

Figure 4A:
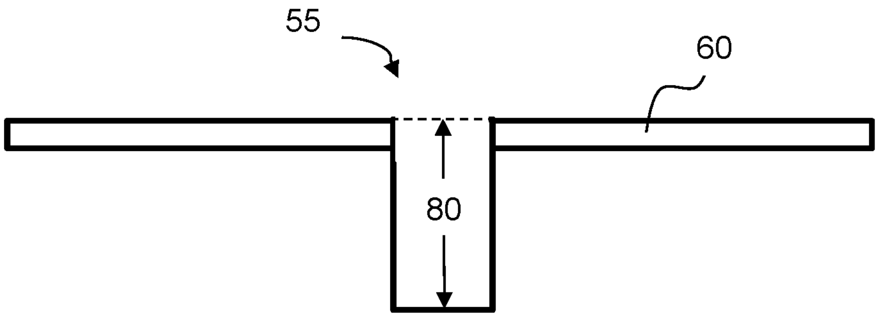
FIG. 4*a* is a cross-sectional view of a flooring aperture in accordance with some embodiments of the presently disclosed subject matter.

The aperture can have any suitable depth 80, as shown in FIG. 4*a*. The term "depth" refers to the distance between flooring 60 and the lowermost portion of the aperture. Thus, aperture 55 can have a depth of about 0.5-5 inches in some embodiments (e.g., at least/no more than about 0.5, 1, 1.5, 2, 2.5, 3, 3.5, 4, 4.5, or 5 inches). However, it should be appreciated that the depth of the aperture is not limited and can be less than or greater than the range given above. It should be appreciated that the greater the depth of the aperture, the more secure the system is (e.g., the more apt the block and pin are to remain in position, even when the door is banged or shaken in an effort to open the door).

Figure 4B:
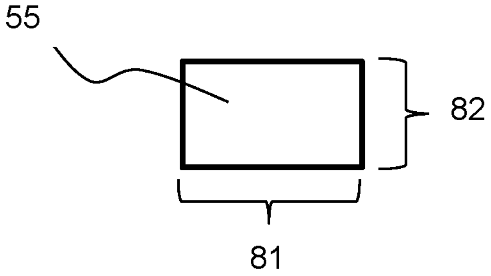
FIG. 4*b* is a side plan view of a system block in accordance with some embodiments of the presently disclosed subject matter.

Aperture 55 can further include any suitable length 81 or width 82, as shown in FIG. 4*b*. The term "length" refers to the longest straight line distance between two opposed edges of the aperture. The term "width" refers to the longest straight line distance perpendicular to the length. For example, the length and/or width of aperture 55 can be about 0.25-2 inches in some embodiments (e.g., at least/no more than about 0.25, 0.5, 0.75, 1, 1.25, 1.5, 1.75, 2, 2.25, 2.5, 2.75, or 3 inches). It is appreciated that the dimensions of the aperture should be small enough to prevent objects from falling into the void, yet large enough to house a pin with dimensions significant enough to resist the door from opening due to applied force from an intruder.

Aperture 55 can be constructed using any suitable method. For example, the aperture can be formed in flooring 60 using any conventional tooling or machinery, as would be known in the art (e.g., routing, milling, chiseling, drilling, and/or the like).

Figure 5A:
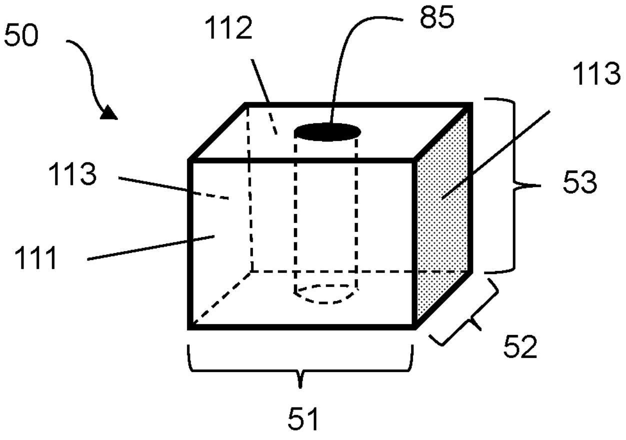
FIG. 5*a* is a perspective view of a system block in accordance with some embodiments of the presently disclosed subject matter.

As noted above, the disclosed system includes block 50 that can be positioned over aperture 55. The term "block" broadly includes any element with internal passageway 85 that passes through the element, as shown in FIG. 5*a*. Block 50 can have any desired shape, such as a cube with a square or rectangular cross-section. However, the shape of the block is not limited. In some embodiments, the block includes at least one flat face, allowing the block to rest easily on horizontal flooring 60.

Block 50 can have any desired length 51, width 52, and height 53, as shown in FIG. 5*a*. For example, the block can have length, width, and/or height of at least about (or no more than about) 2-10 inches in some embodiments (e.g., 2, 3, 4, 5, 6, 7, 8, 9, or 10 inches). However, the dimensions of the block are not limited. The block can include front face 111, opposed rear face 112, and a pair of side faces 113. The block can be configured of sufficient size to prevent the pin from being dislodged, such as when the block is banged by the door in an effort to break the doorway.

Figure 5B:
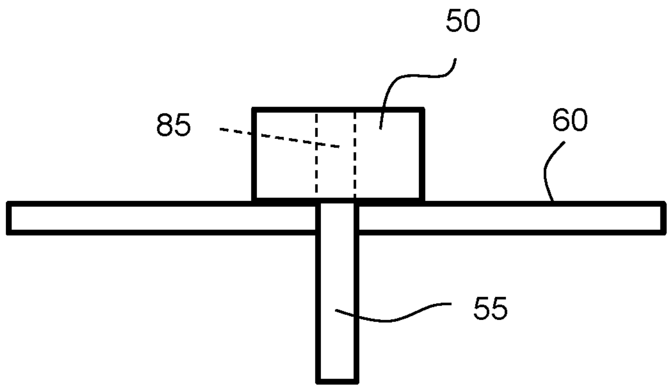
FIG. 5*b* is a cross-sectional view of a system block and aperture in accordance with some embodiments of the presently disclosed subject matter.

As shown in FIG. 5*b*, block passageway 85 can be configured to align with aperture 55. Thus, the block passageway can be in about the same size and about the same cross-sectional shape as aperture 55 in some embodiments. However, the presently disclosed subject matter is not limited and the sizes of the passageway and aperture can differ in size (e.g., passageway 85 can be slightly larger or smaller than aperture 55). The term "slightly" includes about 10 percent or less in some embodiments. Thus, the passageway can have the same or about the same cross-sectional shape and/or dimensions as aperture 55 in some embodiments. The block passageway is also dimensioned to removably receive pin 65 as discussed in detail below.

Block 50 can be constructed from any suitable rigid material, such as (but not limited to) wood, metal (e.g., steel, stainless steel, aluminum), rigid plastic, or combinations thereof. Any suitable material can be used.

Figure 6A:
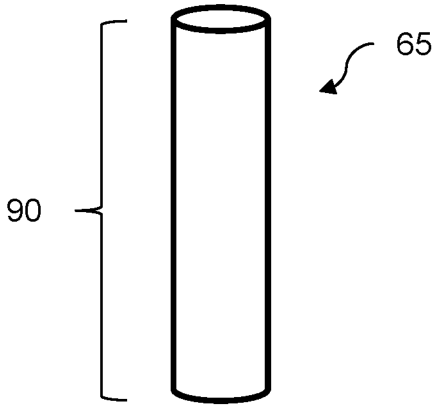
FIG. 6*a* is a perspective view of a system pin in accordance with some embodiments of the presently disclosed subject matter.
Figure 6B:
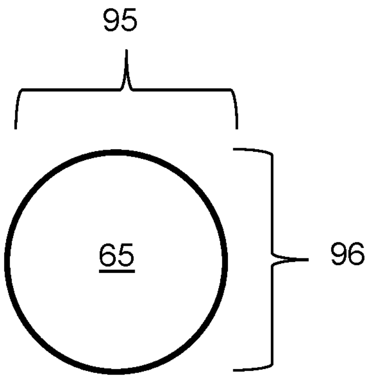
FIG. 6*b* is a top plan view of a system pin in accordance with some embodiments of the presently disclosed subject matter.

As described above, the system also includes elongated pin 65 that is configured to cooperate with both the block and aperture. One embodiment of pin 65 is illustrated in FIG. 6*a*. The pin includes height 90 of about 2-10 inches or more (e.g., at least/no more than about 2, 3, 4, 5, 6, 7, 8, 9, or 10 inches). The term "height" refers to the longest vertical straight-line distance of the pin. As shown in FIG. 6*b*, pin 65 also includes length and width 95, 96 of about 0.25-3 inches in some embodiments (e.g., at least/no more than about 0.25, 0.5, 0.75, 1, 1.25, 1.5, 1.75, 2, 2.25, 2.5, 2.75, or 3 inches). However, it should be appreciated that the pin can have any suitable dimensions.

Pin 65 can have any desired cross-sectional shape, such as (but not limited to) circular, oval, square, rectangular, pentagonal, star-shaped, abstract, and the like. Any shape can be used. It should also be appreciated that pin can include a hollow or solid cross-section.

Figure 6C:
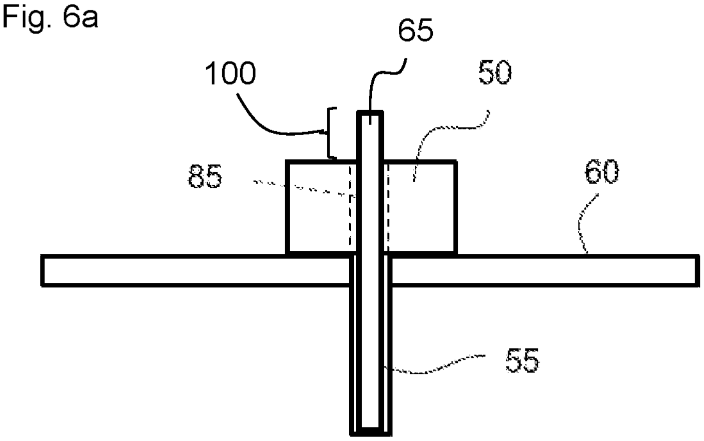
FIG. 6*c* is a cross-sectional view of a system block, pin, and aperture in accordance with some embodiments of the presently disclosed subject matter.

In some embodiments, the cross-sectional shape of pin 65 is the same or about the same as passageway 85 and/or aperture 55. In this way, the pin can easily travel through the interior passageway of the block to rest in the aperture, as shown in FIG. 6*c*.

In some embodiments, the uppermost end of the pin can extend above the top face of the block to provide an area for a user to grasp to add or remove the pin from the system. Specifically, the pin can extend from the top face of the block a distance 100 of about 1-5 inches in some embodiments. In some embodiments, the uppermost end of the pin can include a grasping loop or other element to facilitate the removal of the pin from aperture 55.

Pin 65 can be constructed from any suitable rigid material, such as (but not limited to) wood, metal (e.g., steel, stainless steel), high strength plastic, or combinations thereof. Any material can be used.

Figure 7A:
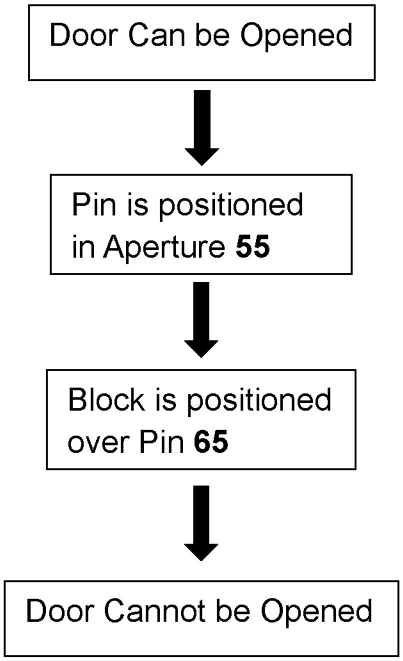
FIG. 7*a* is a schematic of one method of assembling the blocking system in accordance with some embodiments of the presently disclosed subject matter.
Figure 7B:
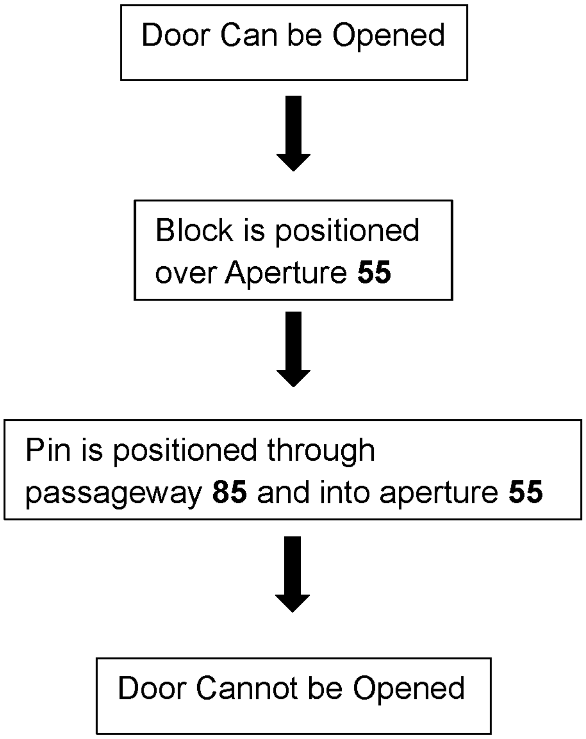
FIG. 7*b* is a schematic of one method of assembling the blocking system in accordance with some embodiments of the presently disclosed subject matter.
Figure 8A:
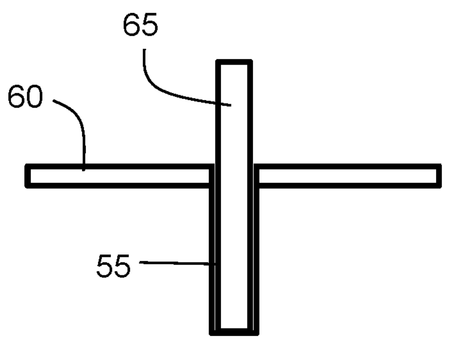
FIGS. 8*a* and 8*b* illustrate one method of assembling the blocking system in accordance with some embodiments of the presently disclosed subject matter.
Figure 8B:
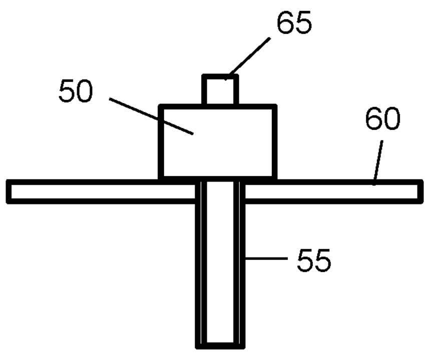
Figure 9A:
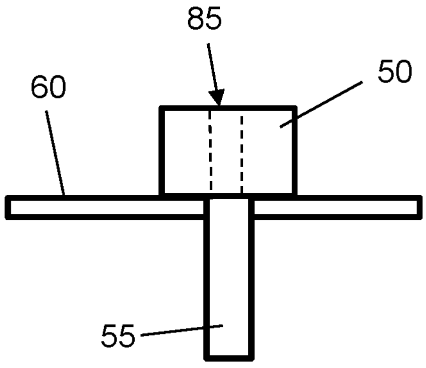
FIGS. 9*a* and 9*b* illustrate one method of assembling the blocking system in accordance with some embodiments of the presently disclosed subject matter.
Figure 9B:
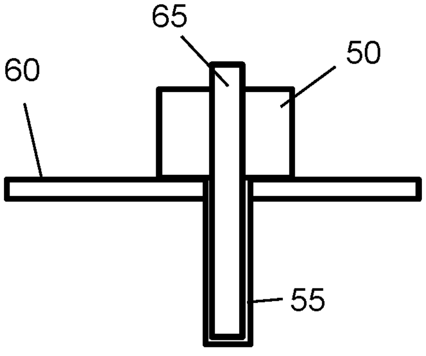

To assemble system 5 and prevent door 5 from opening, the door is initially shut. Pin 65 can be positioned within aperture 55, as shown in the schematic of FIG. 7*a* and the illustration of FIG. 8*a*. Block 50 can then be positioned over the pin, such that the pin travels through block passageway 85, as shown in FIG. 8*b*. The block then remains securely in place, preventing the door from opening past the location of the block. Alternatively, the system can be assembled by first positioning the block over aperture 55 as shown in the schematic of FIG. 7*b* and the illustration of FIG. 9*a*. Specifically, the block is positioned such that the block passageway is aligned with the aperture. The pin can then be configured to pass through the block passageway and into aperture 55, as shown in FIG. 9*b*. In this way, the door cannot be forced open (e.g., the block prevents the door from opening wider than distance 75, which can be small enough to prevent an intruder's body, arm, weapon, etc. from extending into the interior space). Thus, the system (e.g., block 50 and/or pin positioned adjacent to the door) provides increased support to the door and prevents it from being opened into an area or room.

In some embodiments, the interior of aperture 55 and passageway 85 can include screw threads that cooperate with external screw threads positioned on the outer surface of pin 65. In this way, the pin can be screwed in and maintained in position. However, the presently disclosed subject matter is not limited and the screw threads are optional features.

To remove the system, the steps set out in FIGS. 7*a* and 7*b* are simply reversed. For example, pin 65 can be removed from the block passageway and aperture 55, and the block then removed from the flooring. In other embodiments, the block can be removed by lifting from the pin, and the pin can then be removed from aperture 55.

The disclosed system offers many advantages over the prior art. For example, the assembled system ensures that an associated door cannot be opened past a set distance. In this way, intruders cannot break the seal of the door to enter an enclosed area.

The system therefore ensures that homeowners and other users will be secure within their dwellings without undue fear from break-ins.

The disclosed system is easy to assemble and disassemble, such that even children and the elderly can use the disclosed device.

Another advantage of the present invention is that the disclosed system can be easily and quickly mounted between a door and a floor surface.

The disclosed device is unattached to the door, so it does not damage or harm the door, thereby providing support to the door.

The disclosed system can be releasably attached to associated flooring, allowing the user to attach or remove the system as needed.

In view of the foregoing, it is readily apparent that the structure of the present invention provides an improved security door lock system that affords quick and convenient installation on the inside area, adjacent to a door.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A door anti-opening system, the system comprising:

an aperture positioned in a flooring, the aperture located adjacent to a first side and a bottom of a closed door, the closed door comprising:

the first side comprising a doorknob;

an opposed second side;

a top;

the bottom;

a block comprising a bottom face, a top face, a front face and an opposed rear face, a pair of side edges, and an internal passageway positioned in a center of the top face, passing through an interior of the block to a center of the bottom face, wherein the internal passageway has the same dimensions as the aperture, wherein the block is configured as a 6 faced square or rectangle;

a single elongated I-shaped pin comprising a first end and a second end, wherein the pin is configured to removably pass through the internal passageway and into the aperture;

wherein the system is separate from and unattached to the door during use and when the system is assembled; and wherein the block is configured to removably rest on a top surface of the flooring in a closed orientation and the entire system is positioned adjacent to the first side of the closed door such that the rear face of the block abuts the door in a flush manner in the closed orientation, and the block is adjacent to the aperture when the system is assembled and the block is further configured to be removed from the top surface of the flooring when the door is in an open orientation.

2. The system of claim 1, wherein the aperture is positioned 0.25-5 inches from the closed door first side, bottom, or both.

3. The system of claim 1, wherein the aperture is directly adjacent to a portion of the closed door.

4. The system of claim 1, wherein the aperture has a depth of 0.5-5 inches, a length and width of 0.25-2 inches, or both.

5. The system of claim 1, wherein the block has a length, width, and height of 2-10 inches.

6. The system of claim 1, wherein the pin has a height of 2-10 inches.

7. The system of claim 1, wherein the elongated pin has a height that is greater than the depth of the aperture plus the height of the block.

8. A method of preventing the opening of a closed door, the method comprising:

positioning the elongated pin through the internal passageway and into the aperture of the system of claim 1;

wherein the block is held in position contacting the floor over the aperture when the elongated pin passes through the internal passageway and into the aperture; and wherein when the block is held in position, the closed door is prevented from opening; and wherein to open the closed door, the block is lifted away from the floor, allowing the closed door to swing open.

9. The method of claim 8, wherein the elongated pin extends above a top surface of the block when passing through the block internal passageway and into the aperture.

10. The method of claim 8, wherein the aperture is positioned 0.25-5 inches from the closed door first side, bottom, or both.

11. The method of claim 8, wherein the aperture is directly adjacent to a portion of the closed door.

12. The method of claim 8, wherein the aperture has a depth of 0.5-5 inches, a length and width of 0.25-2 inches, or both.

13. The method of claim 8, wherein the block has a length, width, and height of 2-10 inches.

14. The method of claim 8, wherein the elongated pin has a height of 2-10 inches.

15. The method of claim 8, wherein the elongated pin is dimensioned with the same size and shape as the internal passageway and the aperture.

16. The method of claim 8, wherein the elongated pin has a height that is greater than the depth of the aperture plus the height of the block.

17. The method of claim 8, wherein the closed door remains fully closed when the block is held in position over the aperture.

18. The method of claim 8, wherein the closed door opens 2 inches or less when the block is held in position over the aperture.

19. The system of claim 1, wherein the elongated pin has a uniform diameter from the first end to the second end.

20. The system of claim 1, wherein the block travels from the first end of the elongated pin to the second end of the elongated pin via the internal passageway.

* * * * *